United States Patent [19]

Kammiller

[11] Patent Number: 4,566,052
[45] Date of Patent: Jan. 21, 1986

[54] OVERVOLTAGE PROTECTION CIRCUIT FOR POWER SUPPLY

[75] Inventor: Neil A. Kammiller, Lakewood, Ohio

[73] Assignee: Reliance Electric Company, Cleveland, Ohio

[21] Appl. No.: 667,724

[22] Filed: Nov. 2, 1984

Related U.S. Application Data

[62] Division of Ser. No. 402,628, Jul. 28, 1982, Pat. No. 4,525,674.

[51] Int. Cl.[4] ............................................. H02H 3/20
[52] U.S. Cl. ..................................... 361/18; 323/285; 361/55; 361/56; 361/91
[58] Field of Search ...................... 361/55, 56, 91, 104, 361/18; 323/285

[56] References Cited

U.S. PATENT DOCUMENTS 3,594,612  7/1971  Gately ................................. 361/55
3,809,999  5/1974  Smith .................................. 323/285

OTHER PUBLICATIONS

IBM Tech. Dis. Bul., "Constant-Voltage Switching Regulator"—Ruddy, vol. 14, No. 9, 2/72.

*Primary Examiner*—Harry E. Moose, Jr.
*Attorney, Agent, or Firm*—Michael M. Rickin

[57] ABSTRACT

Circuitry for use in a power supply of the type which includes a power switching means and uses a waveform of predetermined shape to control the power switching means such as in a first mode the supply regulates its output voltage and in a second mode controls the current in the power switching means. The circuitry attempts to turn the supply off in response to an overvoltage condition at its output and failing that provides a short circuit path so that current sufficient to cause the fuse in the output to open will flow therethrough.

4 Claims, 8 Drawing Figures

OVERVOLTAGE PROTECTION CIRCUIT FOR POWER SUPPLY

This is a division of application Ser. No. 402,628 filed July 28, 1982 now U.S. Pat. No. 4,525,674.

BACKGROUND OF THE INVENTION

1. Field of the Invention

The present invention relates to power supplies and more particularly to circuitry adapted for use in conventional power supplies of the pulse width modulated (p.w.m.) type to provide for frequency synchronization, insensitivity to temporary disturbances in the load, improved drive current response and improved high voltage shutdown response.

2. Description of the Prior Art

Many types of power supplies now make use of the well-known pulse width modulation (p.w.m.) technique to provide a signal to drive one or more power switching devices at a relatively high frequency. The p.w.m. technique makes use of a sawtooth waveform of predetermined frequency usually in the order of 20 kilohertz for purposes of generating the drive signal to the power switching devices. While the p.w.m. circuitry may be embodied by using any one of the circuit configurations well known in the art, it has become increasingly common to use devices such as integrated circuit chips to embody the p.w.m. circuitry. These chips ordinarily include an internal clock which provides the sawtooth waveform.

The supply which uses the p.w.m. technique is ordinarily connected to a load to provide power thereto. The load may, for example, be a computer controlled device which also has its own internal clock. The computer clock has a frequency which is typically in the order of several megahertz. Quite often the computer clock may be divided down in order to provide a variety of clock frequencies to the circuits contained therein. Ordinarily the internal clock of the p.w.m chip is not at a frequency which is exactly the same as the frequency of the nearest whole number submultiple of the computer clock. This whole number submultiple will be referred to hereinafter as the master clock. Having different frequencies for the master clock and the p.w.m. internal clock gives rise to signal components having frequencies which represent the sum and difference of those frequencies. These components then appear as noise within the computer and may interfere with the operation thereof. It is, therefore, desirable that the clock frequency of the p.w.m. chip be synchronized with the frequency of the master clock of the load and thereby minimize the occurrence of any such noise.

Power supplies may be used to provide d-c power to those types of loads wherein it is desirable that any temporary disturbances in the load not interfere with the steady state operation of the converter. The load which may, for example, be a computer controlled telephone switching system may contain dynamic components such as memory modules. The providing of power to these modules when the memory is to be accessed and its removal therefrom when accessing has been completed may cause a square wave of current to appear in the d-c current provided by the supply to the load. This a-c disturbance component, therefore, appears in the load. While not of long duration, it may, as described below, cause the supplies to sense a current overload condition and change from the normal and desirable, as described hereinafter, voltage regulation mode of operation to a current regulation mode of operation.

Typically the supply includes an output filter which may be embodied as the combination of an inductor and a capacitor. The current flowing in the output inductor attempts to follow those a-c variations in the load current. The inductor is not, however, capable of exactly following those portions of the a-c disturbance current. Where the disturbance current is a square wave, the current in the inductor lags behind the disturbance current for that part of the square wave where the disturbance current is rising. The inductor attempts to compensate for this lag and, therefore, overshoots (spikes) appear in the inductor current. As the output inductor is coupled to the power switching device(s) used in the supply, these spikes also appear in the switch current. The spikes may, therefore, cause the current in the power switch to exceed a predetermined upper limit. The type of coupling between the output inductor and the power switch of the supply depends on the circuit architecture used to embody the supply and may be either direct or through a transformer.

Ordinarily the supply functions in a voltage regulated mode of operation. In this mode, the supply provides an essentially constant and regulated voltage for all conditions of load up to some predetermined overload value of current in the power switch. When the current in the power switch of the supply exceeds the respective overload value, the supply switches to a current regulated mode of operation wherein the supply decreases its output voltage to provide a regulated output current. It is desirable that the associated supply not change its mode of operation in response to temporary a-c disturbances or variations in the load current as once the supply has switched to the current limited mode, it tends for reasons of stability to remain in that mode for some period of time.

A power supply may receive its input voltage from the unregulated output of another supply. The input voltage to the supply is, therefore, unregulated and may vary over a wide range. As the input voltage may vary over a wide range, it is desirable that the drive current generated to the power switch of the supply be kept constant and, therefore, independent of these variations. By keeping the drive current constant for all values of input voltage, the need to dissipate in the form of heat the higher drive losses which occur when the input voltage is at or near the high end of its range is avoided. This reduced dissipation at the high end of the input voltage range is particularly beneficial where an integrated circuit chip is used to embody the p.w.m. circuits of the supply. As is well known in the art, chips are sensitive to high heat as they are generally poor dissipators of such heat. In addition, it is also desirable that the drive current for the power switch start and stop its flow quickly in response to the p.w.m. signal.

In many applications it is desirable that power systems of the switching type include circuits which turn the corresponding supply off if the output voltage therefrom exceeds a predetermined level. Such high voltage shutdown circuits may also include a fuse rated at some predetermined amperage. In those circuits when a voltage about the predetermined level is detected, a short circuit occurs which allows more then rated current to flow through the fuse thereby causing it to open circuit.

The output voltage of the supply may rise above the over voltage level for any one of a number of different reasons. For example, energy stored in the load may, when released, cause the voltage to rise above the predetermined level. In this case, it is not desirable to open circuit the fuse as the supply itself is not the cause of the overvoltage. It is, however, desirable to turn off the supply until the output voltage falls below the overvoltage level. On the other hand, the output voltage may rise above the predetermined level because one of the circuits in the supply has failed. Ordinarily, such a failure would arise as a result of the power switch becoming short circuited. In this case, it is not possible to turn off the supply and wait for the output voltage to fall below the predetermined level. Therefore, in this case, it is desirable that the fuse be open circuited.

In those power systems of the type which include at least a first supply and a second supply, it may be desirable to turn off or shut down only the supply whose output voltage has risen above the predetermined level rather than the entire converter. For example, in such a power system the first and second supplies may be providing power either to separate loads or to parts of the same load which is of the type wherein it is possible to turn off one of the voltages without affecting the entire operation of the load. Therefore, in such a power system if an overvoltage condition should occur at the output of the second supply, it is desirable to turn off that supply but not the entire converter.

SUMMARY OF THE INVENTION

According to the present invention, there is disclosed a power supply and circuits for use therein. The power supply is of the type which includes a power switching means and uses a waveform of predetermined shape to control the power switching means operation to thereby in a first mode regulate the voltage at the supply output and in a second mode control the current in the power switching means. The supply switches to its second mode of operation when the current exceeds a predetermined amplitude. The supply also includes a fuse in series with one of its two outputs.

According to the present invention, there is disclosed a synchronizing circuit for use in the power supply for synchronizing the frequency of the waveform of predetermined shape to the master clock frequency in the load. The circuit includes means which generates a syncing signal for each cycle of the master clock. A timing means generates pulses at a first predetermined rate in the absence of syncing signals and at a second predetermined rate in response thereto. A circuit means then generates the waveform of predetermined shape with a first frequency when there are no timing means pulses, at a second frequency when the timing means pulses are generated at the first rate and at a third frequency when the pulses are generated at the second predetermined rate.

According to the present invention, there is also disclosed a power supply which includes inhibiting means which prevent the supply from switching from its voltage control mode to its current limited mode in response to rapid variations caused in the power switching current by temporary disturbances. The means respond to the signal representative of the current in the power switch to generate a signal to the input of the voltage regulating means to which the signal representative of output voltage is connected. This signal inhibits the switching of the supply from the voltage regulated mode to the current control mode in response to the temporary disturbances.

According to the present invention, there is further disclosed a circuit for use in the power supply to provide in response to a regulating signal having a first and second amplitude drive current to the power switching means. The drive circuit comprises a turn-off means which is connected to the power switch for turning off the drive current in response to the regulating signal first amplitude. Also part of the drive circuit is a turn-on means which turns on the flow of drive current in response to the regulating signal second amplitude. The turn-on means includes a transistor arranged in the common base configuration having its collector connected to both the turn-off means and the switching means, its emitter connected to receive the regulating signal and its base connected to a source of constant voltage.

According to the present invention, there is finally disclosed a circuit for use in the power supply which attempts to turn off the supply in response to the output voltage exceeding a predetermined amplitude and at some later time provides a short circuit across the supply output which allows current sufficient to open the fuse to flow therethrough unless the supply has been turned off. The circuit comprises means to generate a signal representative of the supply output voltage. Means which respond to the representative signal and a reference signal representative of a predetermined amplitude of output voltage generates an overvoltage signal when the output voltage exceeds the reference. A first semiconductor has its control electrode connected to the overvoltage signal and responds thereto to turn on and generate the signal to the turn-off means. The first semiconductor has a turn-on threshold. A second semiconductor has its electrode connected through a threshold increasing means to the overvoltage means. The turn-on threshold of the second semiconductor is increased to be greater than the turn-on threshold of the first semiconductor so that it turns on after the first semiconductor does. The second semiconductor is connected to the output terminals of the supply so as to provide a short circuit thereacross when it turns on.

DESCRIPTION OF THE PREFERRED EMBODIMENTS

Figure 1:
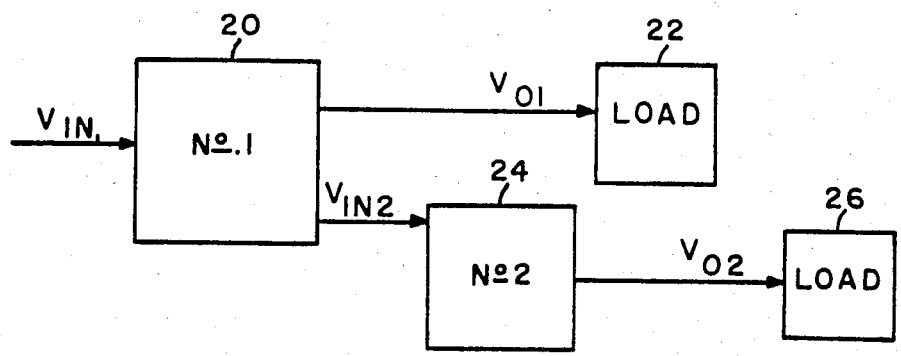
FIG. 1 is a block diagram of a typical power supply system in which the present invention may be used.

Referring to FIG. 1 there is shown a converter 10 which provides from a single input voltage, designated as $VIN_1$, at least two regulated output voltages, designated as $V_{O1}$ and $V_{O2}$, respectively. Converter 10 includes a first power supply 20 which generates at a first output from the voltage $VIN_1$ the regulated voltage $V_{O1}$ to thereby supply power to load 22. Supply 20 also generates at a second output from $VIN_1$ an unregulated voltage designated as $VIN_2$. This voltage is the input voltage to a second power supply 24 which generates at its output the regulated output voltage $V_{O2}$ which is used to supply power to load 26. First supply 20, therefore, provides both a regulated output voltage to the load 22 connected thereto and an unregulated output voltage which is used as the input to a second supply 24.

As first supply 20 provides the input voltage for second supply 24, the second supply and its load 26 may also be considered to be a load on supply 20. While FIG. 1 has shown first supply 20 providing the input voltage only to one other supply, it should be appreciated that supply 20 may provide the input voltage for a number of additional supplies arranged in the manner of supply 24. It should further be appreciated that while FIG. 1 has shown separate loads 22 and 26 connected to supplies 20 and 24, these loads may be part of a single load such as a computer wherein supplies 20 and 24 each may provide a different regulated voltage for use in the load.

Figure 2A:
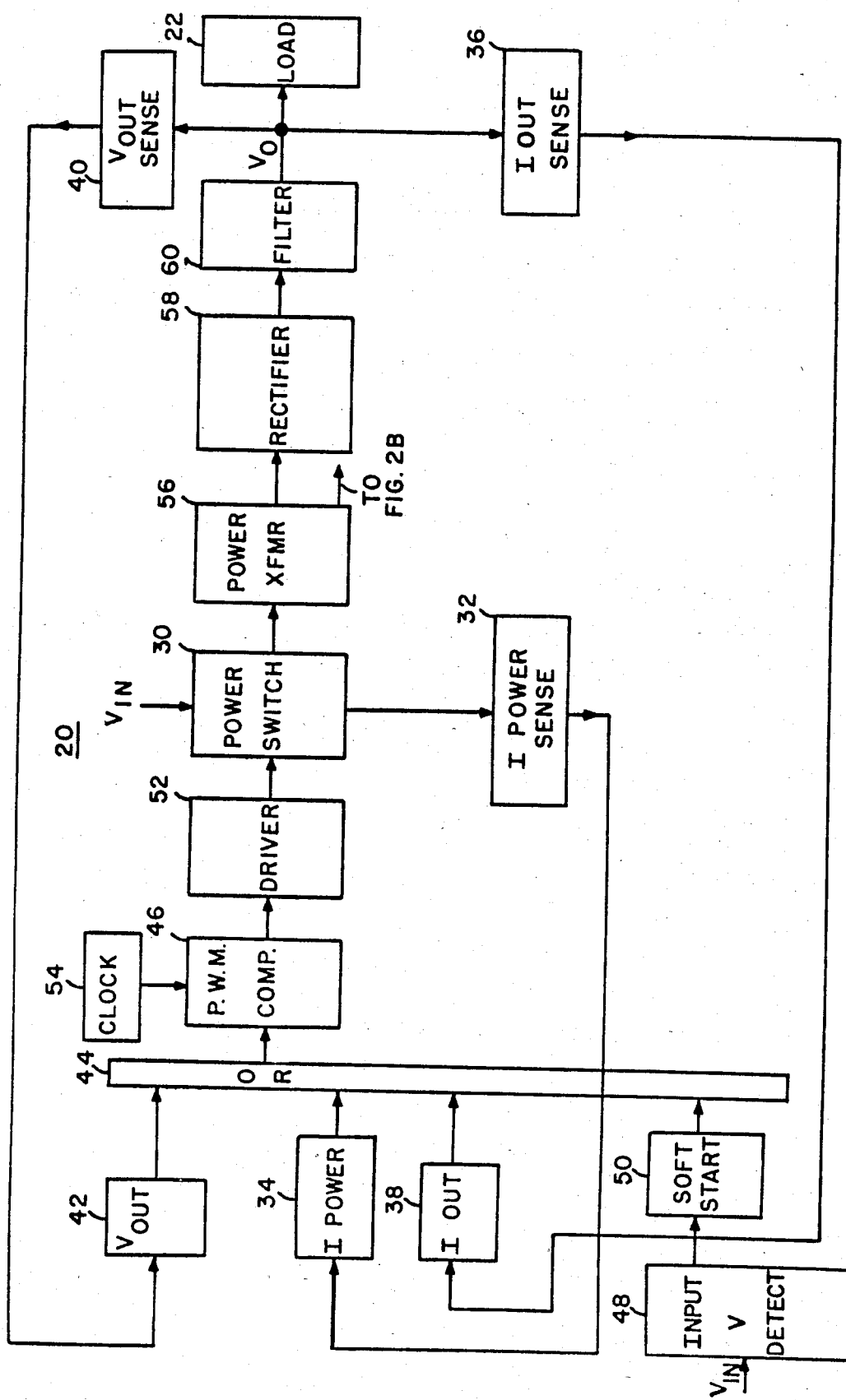
FIGS. 2A and 2B are block diagrams of typical embodiments for the power two power supplies of the system shown in FIG. 1.

Referring to FIG. 2A there is shown a block diagram for a typical embodiment of first supply 20. Supply 20 is of the type wherein a power switch 30 is turned on and off by the use of the well-known pulse width modulation (p.w.m.) technique. The operation of supply 20 is controlled as a function of either its output voltage or output current or current in the power switch 30. Supply 20 includes a circuit 32 which is used to monitor the current in the power switch 30. As is well known in the art, it is desirable to monitor the current in the power switch so as to be able to control the switching of switch 30 in the event that excessive current should flow therein.

The current in switch 30 may be monitored by a transformer. The sensing transformer is connected to a circuit 34 which generates a d-c signal which is representative of the current being monitored. Circuit 34 then compares that d-c signal to a predetermined reference signal. Circuit 34 may be embodied by the combination of a first diode having its anode connected to one end of the secondary winding of the monitoring transformer and its cathode connected to the parallel combination of a resistor and a capacitor which provides a load for the monitoring transformer. The first diode disconnects the load when the power switch is off to thereby allow the monitoring transformer to be reset. In this manner, energy which is stored in the transformer core during the time the transformer is set is not dissipated across the transformer load. A peak charging circuit including a diode, a capacitor and a resistor may then be connected across the load to generate a d-c voltage representative of the current being monitored.

The d-c signal representative of the current is stored in the capacitor of the peak charging circuit and is one input to an operational amplifier functioning as an analog comparator. The other input to the comparator is a d-c signal which corresponds to a predetermined current. When the current being monitored reaches or exceeds the predetermined amplitude, the switching of the power switch is then controlled by circuit 34 to thereby regulate the current to the predetermined amplitude.

As supply 20 provides not only a regulated voltage $V_{O1}$ to its own load 22 but also provides a voltage $VIN_2$ to a second supply 24, it is necessary that supply 20 not only monitor the current in switch 30 but also monitor the current $I_{O1}$ provided to load 22. This current may be monitored by sensing the current through a suitably arranged circuit 36 and generating voltage representative thereof. Sensing circuit 36 is connected to a circuit 38 which first generates a d-c voltage representative of $I_{O1}$ and then compares this voltage to a predetermined reference. The portion of the circuit 38 which generates the representative d-c voltage may be embodied as described previously for circuit 34. The representational d-c voltage is connected as one input to an operational amplifier, the other input of which is connected to receive the predetermined reference voltage. The operational amplifier is arranged to change its state when the output current exceeds the reference.

Supply 20 must also monitor its output voltage, $V_{O1}$, to maintain regulation thereof. A sensing circuit 40 is used to provide a sample of $V_{O1}$ to circuit 42 which compares two voltages. One of the voltages compared by circuit 42 is simply a voltage proportional to $V_{O1}$ and may be obtained by use of a resistive voltage dividing network having $V_{O1}$ as its input voltage. The other voltage compared by circuit 42 is a reference voltage which may be provided by the combination of a zener diode and a resistive network including an adjustable resistor.

Each of the outputs of circuits 34, 38 and 42 are provided as inputs through OR circuit 44 to p.w.m. comparator circuit 46. The output of supply 20 is then controlled by circuit 46 as a function of either the output voltage or current or the current in power switch 30. A clock circuit 54 provides the sawtooth waveform which circuit 46 uses in its comparison. While circuits 34, 42, 44, 46 and 54 have been shown as separate, they may be embodied by an integrated circuit chip such as type 494 which is available from manufacturers such as Texas Instruments or Motorola.

Sometimes it is desirable to provide circuitry which ensures that the p.w.m. circuitry of the supply does not provide a usable output to switch 30 until such time as the input voltage to the supply reaches a predetermined amplitude. This circuitry is provided in the form of input voltage detector 48 and soft start circuit 50, the output of which is connected as another input to OR circuit 44. The input voltage to supply 20 may, for example, be provided from a d-c source such as the bank of batteries located at a typical telephone operating company central office.

Detector circuit 48 may, for example, be embodied by an operational amplifier one input of which receives a predetermined reference voltage generated from a stable source such as a zener diode in combination with a resistive voltage dividing network. The other input to the operational amplifier may be connected by a voltage dividing network to receive a voltage representative of the input voltage to supply 20. When the input voltage exceeds the reference voltage, the operational amplifier changes its state to provide a signal to soft start circuit 50.

Soft start circuit 50 may be embodied, for example, by a capacitor which prior to the change in state of the operational amplifier in circuit 48 has been held discharged by a transistor. One end of the capacitor may be connected to a predetermined voltage. The other end of the capacitor is connected to the appropriate one of the inputs of the 494 chip when the p.w.m. circuitry is so embodied. When the operational amplifier changes states, the transistor then allows the capacitor to charge down to common (OV). In response thereto the chip is activated to thereby provide a usable output to switch 30 and associated driver circuit 52.

Supply 20 also includes a power transformer 56 whose primary winding is connected in series combination with switch 30. Connected to the secondary winding of the transformer is the combination of rectifier 58 and filter 60. Transformer 56 also includes an additional secondary winding which is used to provide the input voltage to supply 24. The circuitry which may be used to embody switch 30, transformer 56, rectifier 58 and filter 60 depends on the type of switched mode power architecture that is used for supply 20. For example, if supply 20 uses the well-known feed forward or, as it sometimes may be called, forward converter architecture, then energy is transferred to the load when power switch 20 is conducting. When the switch is turned off, part of the energy which is stored in filter 60 is transferred to the load through a commutating or freewheeling diode (not shown) which is connected in shunt between rectifier 58 and filter 60. Rectifier 58 may be embodied in its simplest form by a diode connected in series with the secondary winding of transformer 56. Filter 60 may be embodied in its simplest form by an L-C network in which the inductor is in series with the rectifier diode. It is the energy stored in the inductor which is transferred to the load during the off time of switch 30.

Figure 2B:
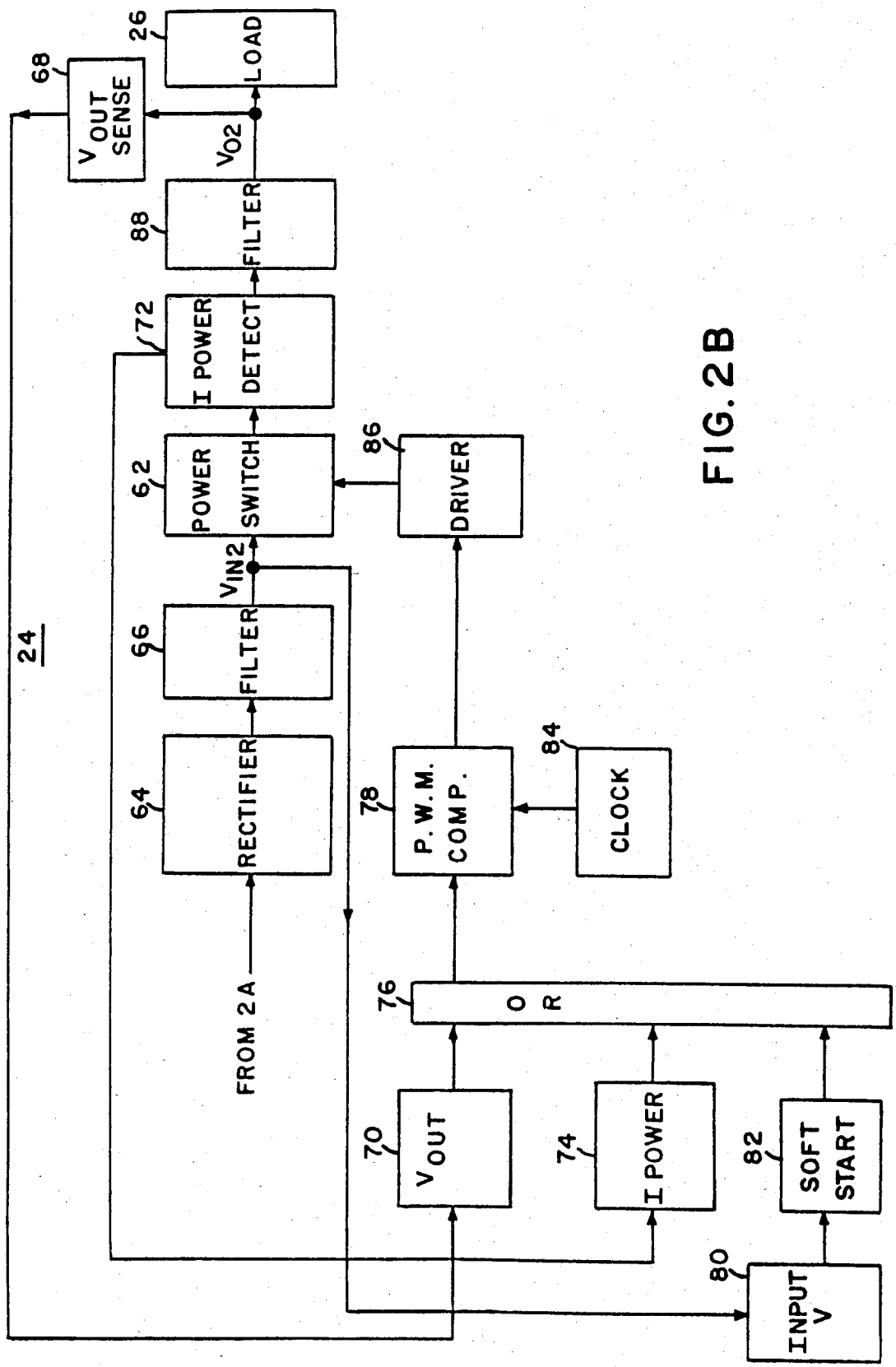

Referring to FIG. 2B there is shown a block diagram for a typical embodiment of second supply 24. Supply 24 also utilizes the p.w.m. technique to control the operation of power switch 62. The operation of supply 24 is controlled as a function of either its output voltage or the current in power switch 62. It is not necessary to monitor the output current of supply 24 as the supply provides voltage only to load 26.

Supply 24 is similar in structure to supply 20 and, as pointed out hereinafter, most of the blocks shown in FIG. 2B may be embodied by the type of circuitry described previously for the corresponding blocks of supply 20. As described above, supply 24 receives its input voltage from the secondary winding of supply 20. This unregulated voltage is rectified and filtered by circuits 64 and 66 to provide the voltage designated as $V_{IN2}$ to supply 24. Circuits 64 and 66 may be embodied as described previously for rectifier 58 and filter 60 of supply 20. When supply 20 is of the feed forward type, then a commutating diode (not shown) is connected in shunt between rectifier 64 and filter 66.

Supply 24 also includes output voltage sensing circuit 68 which is used to provide a sample of the output voltage $V_{O2}$ to a circuit 70. As described previously for supply 20, circuits 68 and 70 allow supply 24 to maintain regulation of its output voltage. Circuits 68 and 70 may be embodied as described previously for corresponding circuits 40 and 42 of supply 20.

Supply 24 also includes detecting circuit 72 which is used to monitor the current flowing in power switch 62 and provide a sample thereof to circuit 74. As described previously for supply 20, circuits 72 and 74 allow supply 24 to control the current flowing in switch 62. Circuits 72 and 74 may be embodied as described previously for corresponding circuits 32 and 34 of supply 20.

While circuits 70 and 74, OR circuit 76, p.w.m. comparator circuit 78 and clock circuit 84 are shown as individual units in FIG. 2B, they may, for example, be embodied as was described previously for corresponding circuits 44, 46 and 54 of supply 20 by the 494 chip. Supply 24 also includes, as did supply 20, an input voltage detection circuit 80 and a soft start circuit 82. These circuits are included for the reasons described previously in connection with circuits 48 and 50 of supply 20 and function and may be embodied as described therein.

Supply 24 is of the type in which switch 62 in response to the signal from driver circuit 86 chops the d-c voltage $V_{IN2}$. In each cycle of operation the conduction time of power switch 62 is controlled by p.w.m. comparator 78 to provide either a regulated voltage to load 26 or in response to excessive current flowing in switch 62 to reduce the output voltage and thereby reduce the current to a predetermined reference. A filter circuit 88 which may be embodied as described previously for filter 60 of supply 20 provides at its output the d-c voltage $V_{O2}$.

Figure 3B:
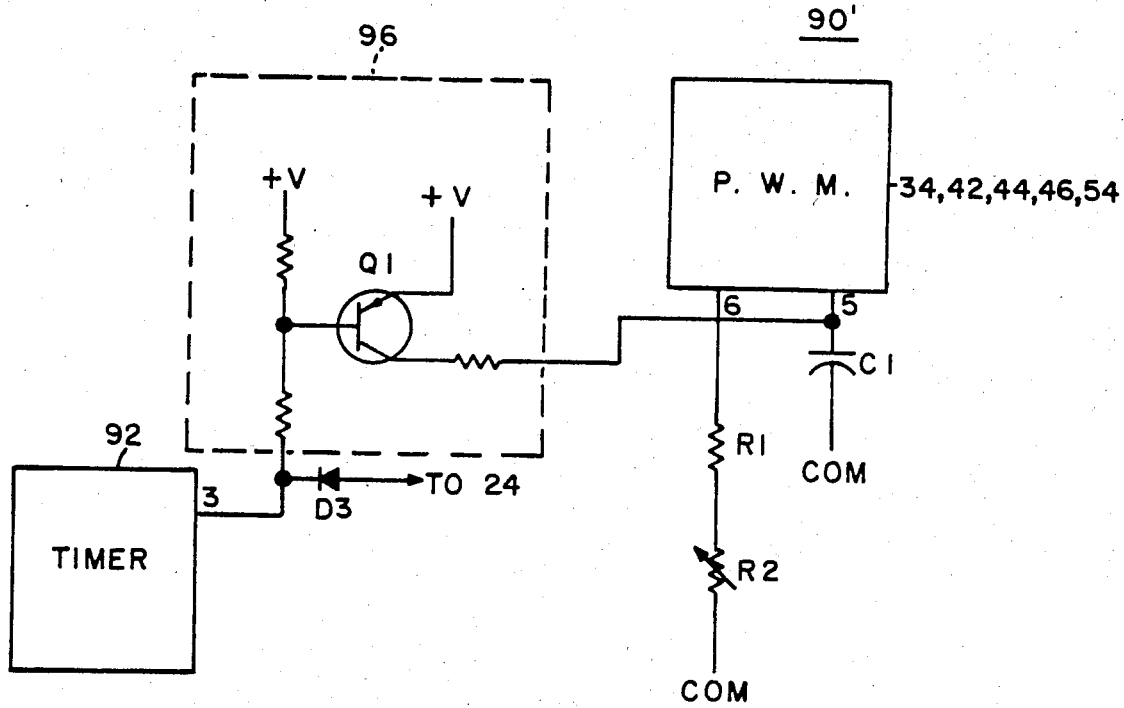
FIGS. 3A and 3B are schematic diagrams of various embodiments for the synchronizing circuit of the present invention.
Figure 3A:
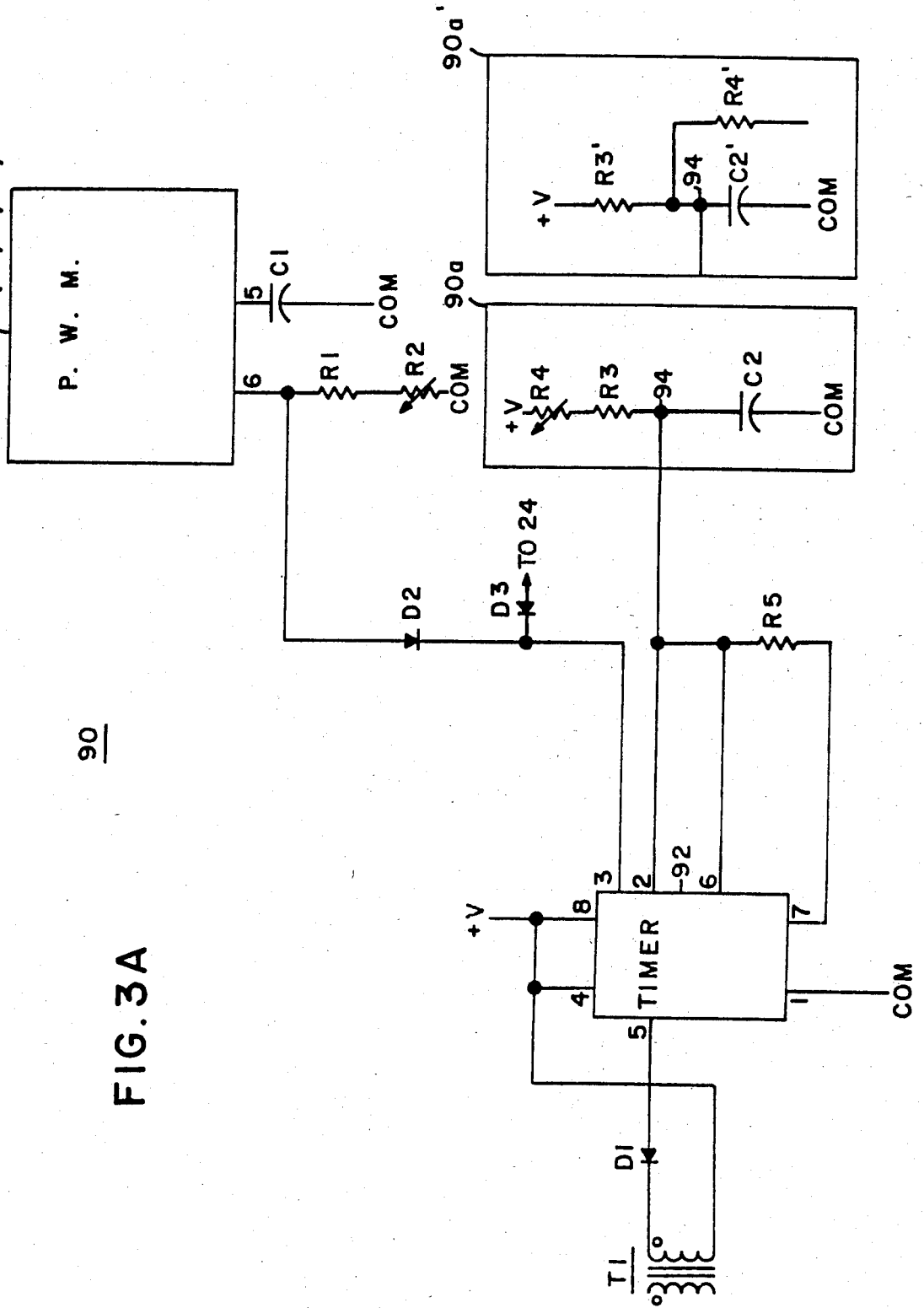

In FIGS. 3A and 3B there are shown alternative embodiments for circuits which may be included in supply 20 and used to accomplish the synchronization of the clock frequency of the p.w.m. circuitry of the supply and the frequency of the master clock in the load 22. While in describing each of these circuits it is assumed that the p.w.m. circuitry of the supply is embodied by the 494 chip, it should be appreciated that these synchronizing circuits may be used in connection with any embodiments of the p.w.m. circuitry wherein the circuitry would ordinarily have an internal clock frequency which is different than the frequency of the load's master clock.

Referring to FIG. 3A there is shown the schematic diagram of one embodiment of the circuit 90 for providing synchronization between the internal clock of the p.w.m. chip and the master clock of the load. The 494 p.w.m. chip includes pin 5 to which one end of a capacitor C1 is connected and pin 6 to which one end of the series combination of a fixed resistor R1 and an adjustable resistor R2 are connected. The other ends of the capacitor and the series resistor combination are connected to the common (COM) of supply 20. Timing capacitor C1 and resistors R1 and R2 form an R-C circuit which determines the internal clock frequency of the chip.

Pin 6 of the chip is also connected by the diode D2, poled as shown, to the output of a timing circuit 92. It is circuit 92 which provides the pulse to the p.w.m. chip which ordinarily forces the internal clock thereof to run at the same frequency as the master clock. Circuit 92 may be embodied by any one of a number of commercially available timing chips such as the 555 type available from National Semiconductor. For ease of description, it is assumed that the 555 type is used in FIG. 3A to embody circuit 92 and the various pin numbers shown in connection therewith correspond to the actual pin numbers for that timer type.

For each cycle of the master clock a negative-going pulse appears at the dotted end of the primary winding of transformer T1. This pulse will be referred to hereinafter as the sync pulse. The transformer T1 provides isolation and the sync pulse is coupled to its secondary winding, the dotted end of which is connected by a diode D1, poled as shown, to pin 5 of timer 92. The nondotted end of the secondary winding is connected to pins 4 and 8 of the timer and they in turn are connected to a positive voltage, $+V$.

In the absence of sync pulses, timer 92 runs at a frequency which is determined by the series timing circuit 90a formed by the combination of capacitor C2 and fixed resistor R3 in series with adjustable resistor R4. One end of capacitor C2 is connected to supply common and the other end is connected at junction 94 to one end of resistor R3. This junction is in turn connected to pins 2 and 6 of timer 92. The other end of resistor R3 is connected to one end of resistor R4 which has its other end connected to the positive voltage, +V. Pin 6 of the timer is connected by a resistor R5 to pin 7 thereof. This resistor in combination with capacitor C2, as will be described hereinafter, determines the width of the pulse which appears at timer output pin 3.

In the absence of sync pulses, timer 92 runs at the frequency determined by the timing circuit 90a. Internal to the timer is a resistive divider network (not shown) which in the absence of sync pulses allows the timer to generate a sawtooth at the timing circuit determined frequency. In each cycle this sawtooth starts at the lower threshold voltage, +V/3, and terminates when capacitor C2 has charged to the upper threshold, +2 V/3. The timer then generates at pin 3 a negative-going pulse whose width is determined by R5 and C2. The occurrence of a sync pulse causes the internal sawtooth of the timer to prematurely terminate as the sync pulse reduces the upper threshold voltage to be less than +2 V/3. In the presence of sync pulses, timer 92, therefore, generates pulses at its output which occur at a frequency which is higher than the frequency at which the pulses would occur if determined solely by the timing circuit.

As described previously, the dotted end of the secondary winding of transformer T1 is connected to pin 5 of the timer by diode D1. This diode decouples the transformer from the timer in the absence of sync pulses. As described above, the sync pulse occurs once during each cycle of the master clock. When the load is a computer controlled device, the master clock has been derived from the computer's internal clock. Under certain circumstances the load may cease generating the master clock. One such temporary cessation occurs when the load is of the type which monitors its own clock for drift. If the load clock should drift beyond predetermined limits, the sync pulses are terminated. In that case it would be desirable for timer 92 to continue to generate a pulse at pin 3 even if this pulse is at the lower frequency determined by the timing circuit. Diode D1 ensures that the timing circuit will operate in this manner in the absence of sync pulses.

Timing circuit 90a, as described above, includes adjustable resistor R4. It may be desirable to replace this timing circuit with one which does not use an adjustable resistor but only fixed resistors. Removing the adjustable resistor from the timing circuit eliminates the possibility that the resistor and, therefore, the circuit will be misadjusted. A timing circuit which uses only fixed resistors and which may be used to replace circuit 90a without the necessity of additional changes in circuit 90 is also shown in FIG. 3A and is designated as 90a'. Not only does circuit 90a' provide the desirable results described above, but, as will be described hereinafter, it also is designed such that timer 92 does not free run in the absence of sync pulses.

The principal differences between the two timing circuits are that in circuit 90a' a fixed resistor R3' is connected between junction 94 and the positive voltage +V and a fixed resistor R4' is connected in parallel with capacitor C2' between junction 94 and circuit common. In the absence of sync pulses, capacitor C2' charges to a voltage, Vc2', which is given by the equation:

$$Vc2' = R4'/R3' + R4' \cdot V$$

As described above, in the free running mode timer 92 terminates each cycle of the internal sawtooth when the voltage on the capacitor reaches $+\frac{2}{3}$ V. The value of voltage at which such termination occurs will be referred to hereinafter as the termination threshold. By selecting the value of the resistance of resistors R3' and R4', the voltage on the capacitor in the absence of sync pulses can be held to be below the termination threshold. Upon the occurrence of a sync pulse at pin 5 of the timer, the termination threshold, as described above, is caused to fall below the threshold present in the absence of sync pulses. If the resistances of resistors R3' and R4' are selected to not only cause the capacitor to reach a voltage which is below the threshold in the absence of sync pulses, but which is above the threshold in the presence of sync pulses, then timer 92 will generate the desired pulses at its output pin 3.

As mentioned above, the nondotted end of the secondary winding of T1 is connected to +V volts. This connection gives rise to a noise immunity of +V/3 volts in circuit 90. The connection ensures that at least +V/3 volts have to be developed across the transformer's secondary winding before a sync pulse will affect the operation of timer 92 in the manner described above. Under certain circumstances it may be desirable to connect a capacitor (not shown) between pins 1 (connected to supply common) and 5 of timer 92. Such a capacitor will act as a bypass and ensure that the voltage across the timer's internal divider is kept constant even if a high noise level source is supplying the timer.

The negative-going pulse generated at output pin 3 of timer 92 is connected by diode D2 to pin 6 of the p.w.m. chip. The p.w.m. chip operates at a frequency which is ordinarily determined by the combination of resistors R1 and R2 and capacitor C1. For its own internal usage the type 494 chip generates a sawtooth waveform each cycle of which terminates at a predetermined threshold. The chip generates the sawtooth by charging capacitor C1 from an internal current source. Upon the occurrence of the pulse at pin 3 of timer 92, the diode D2 is effectively connected into the timing circuit of the p.w.m. chip to momentarily lower the impedance of R1 and R2. This momentary lowering of impedance causes the internal charging current of the p.w.m. chip to increase to thereby charge capacitor C1 faster. The capacitor then reaches its threshold sooner than it ordinarily would and the frequency of the sawtooth waveform used by the chip for making p.w.m. comparisons is therefore speeded up.

The synchronization circuit described above performs its function by affecting the internal charging current of the 494 chip. It may be desirable to obtain the same synchronization without affecting the internal operation of the chip. FIG. 3B shows an alternative embodiment for circuit 90 which accomplishes this result. This alternative embodiment is designated as 90'. As circuit 90' differs from circuit 90 in respect to the charging of capacitor C1, only those differences are shown in FIG. 3B and discussed below.

The major difference between circuit 90' and previously described circuit 90 is that diode D2 of circuit 90 is replaced by current source 96 of circuit 90'. In addition, whereas diode D2 has its anode connected to pin 6 of the p.w.m. chip, source 96 has its output connected to chip pin 5 and, therefore, directly to timing capacitor C1. Upon the generation of the negative-going pulse at pin 3 of timer Q1, the transistor contained in source 96 is pulsed on. The transistor then supplies an additional current to capacitor C1 which is additive to that being supplied the capacitor from the internal current source of the p.w.m. chip. The capacitor, therefore, reaches the threshold sooner than it normally would and the operating frequency of the p.w.m. chip is, therefore, controlled to be higher than it would be if determined solely by R1, R2 and C1.

In both FIGS. 3A and 3B there has been shown a diode D3 having its cathode connected to pin 3 of timer 92. In discussing the operation of circuits 90 and 90' it has been assumed that the synchronizing circuit is located in supply 20. Supply 24 also uses the p.w.m. technique and it is desirable that the operation of its p.w.m. circuit be synchronized to the master clock of the load. Diode D3 is used to convey the pulse from the timer output to supply 24. This pulse may be directly connected to the p.w.m. chip through, depending upon the embodiment, either diode D2 or source 96. It may, however, be beneficial to provide in supply 24 an arrangement identical to transformer T1 and timer 92 for receiving and reshaping the pulse conveyed to the supply by diode D3.

Figure 4:
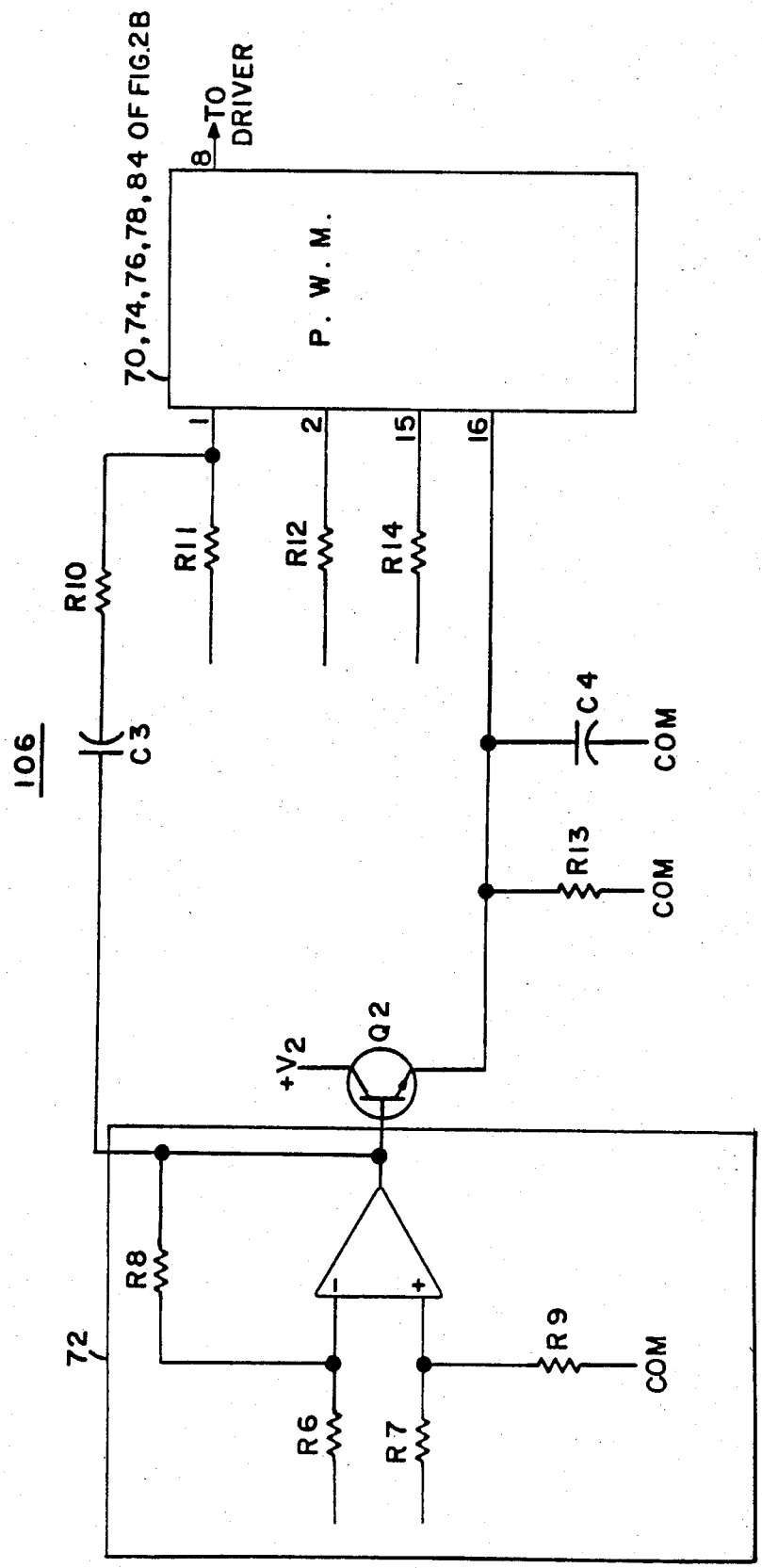
FIG. 4 is a schematic diagram of one embodiment for the circuit of the present invention which inhibits switching of the power supply from its voltage control mode to its current control mode in response to temporary disturbances in the output current.

Referring to FIG. 4 there is shown a schematic diagram for a circuit 106 included in supply 24 which functions to keep the supply in its voltage regulation mode of operation when a temporary a-c disturbance appears in the load current. While in describing this circuit it is assumed that the p.w.m. circuitry of supply 24 is embodied by the 494 chip, it should be appreciated that this circuit may be used in conjunction with any embodiment of the p.w.m. circuitry of supply 24. It should also be appreciated that, while the operation of this circuit is described in conjunction with supply 24, this circuit may also be used in supply 20 or in any supply of a type similar to that of either supply 20 or 24 wherein it is desired to, in effect, insulate the operation of the supply from temporary a-c disturbances that appear in the load current.

As described above, the a-c disturbance in the load current appears as an a-c signal in the output current of the power switch 62 of supply 24. Also as described above, the power switch output current exhibits large spikes at those points wherein the a-c disturbance undergoes a fast transition. Circuit 72 senses by the use of a resistor (not shown) the output current of the power switch. This current is supplied to both the inverting and noninverting inputs of an operational amplifier by resistors R6 and R7, respectively. The inverting input of the amplifier is connected to its output by a resistor R8. The noninverting input of the amplifier is also connected to supply common by a resistor R9. The output of the amplifier is connected to the circuit 106 which provides the desired insulation of supply 24 to the temporary a-c disturbances in the load current generated by the supply.

Circuit 106 is formed by the series combination of a capacitor C3 and a resistor R10. The capacitor is connected to the output of the operational amplifier of circuit 72 and the resistor is connected to input pin 1 of the 494 p.w.m. chip. The pin numbers used herein are those associated with the chip. Also connected to chip input pin 1 is one end of a resistor R11. The other end of the resistor is connected to receive the sample of supply ouput voltage from sense circuit 68 (see FIG. 2B). Input pin 2 of the chip is connected to one end of a resistor R12, the other end of which is connected to a source (not shown) which provides a reference signal for the output voltage. The chip includes an internal comparator which compares the sample of supply output voltage received on input pin 1 to the reference voltage received on input pin 2 to thereby control the width of the chip output signal as a function of the supply output voltage. The output signal of the chip appears on pin 8 thereof which is connected to driver 86 of supply 24.

The p.w.m. chip also includes input pins 15 and 16 which are connected to a comparator internal to the chip which controls the output signal in pin 8 as a function of the current in the power switch. The output of the operational amplifier in circuit 72 is connected by a transistor Q2 to input pin 16. Also connected to pin 16 are the parallel combination of a resistor R13 of relatively large resistance and a capacitor C4. Transistor Q2 acts as a buffer to allow capacitor C4 to respond relatively rapidly to increases in power switch current. The response of the capacitor to decreases in power switch current is determined by the R-C time constant of resistor R13 and capacitor C4. This time constant is in the order of several hundred milliseconds and provides stability for the control loop of the supply. Therefore, once the supply switches to the current regulation mode, it tends to remain in that mode for some considerable length of time. Pin 15 is connected to a resistor R14, the other end of which is connected to a reference signal which represents the amplitude of power switch current at which the supply changes from operation in the voltage regulated mode to operation in the current regulated mode.

Circuit 106 functions in the presence of the rapid changes in power switch current to prevent that current from reaching the mode switching limit. The output voltage of the supply responds to the disturbances in load current in a manner opposite to the response of the output current. As the output current increases, the output voltage decreases. If circuit 106 were not present, then supply 24 would attempt to bring its output voltage back to the regulated value. Circuit 106 functions in a manner so as to cause the supply output voltage to decrease even further than it ordinarily would in the presence of a rapidly decreasing component of disturbance current. This decrease in output voltage tends to keep the current in the power switch from reaching the mode changing limit threshold. In a similar manner, as the load current exhibits a rapid decrease due to the presence of a-c disturbance current, the output voltage of the supply tends to increase. Circuit 106 responds to the rapid decrease in power switch current and causes the supply output voltage to increase further that it ordinarily would in the presence of the rapidly decreasing disturbance current. Thus, circuit 106 responds to the rapid changes in the power switch current to control the supply output voltage in a manner so as to tend to keep the supply from switching from its voltage regulated mode of operation to its current regulated mode.

In a circuit constructed in accordance with the present invention, the following component values were used:

$R6 = R7 = 2.74 \times 10^3$ ohms

Figure 5:
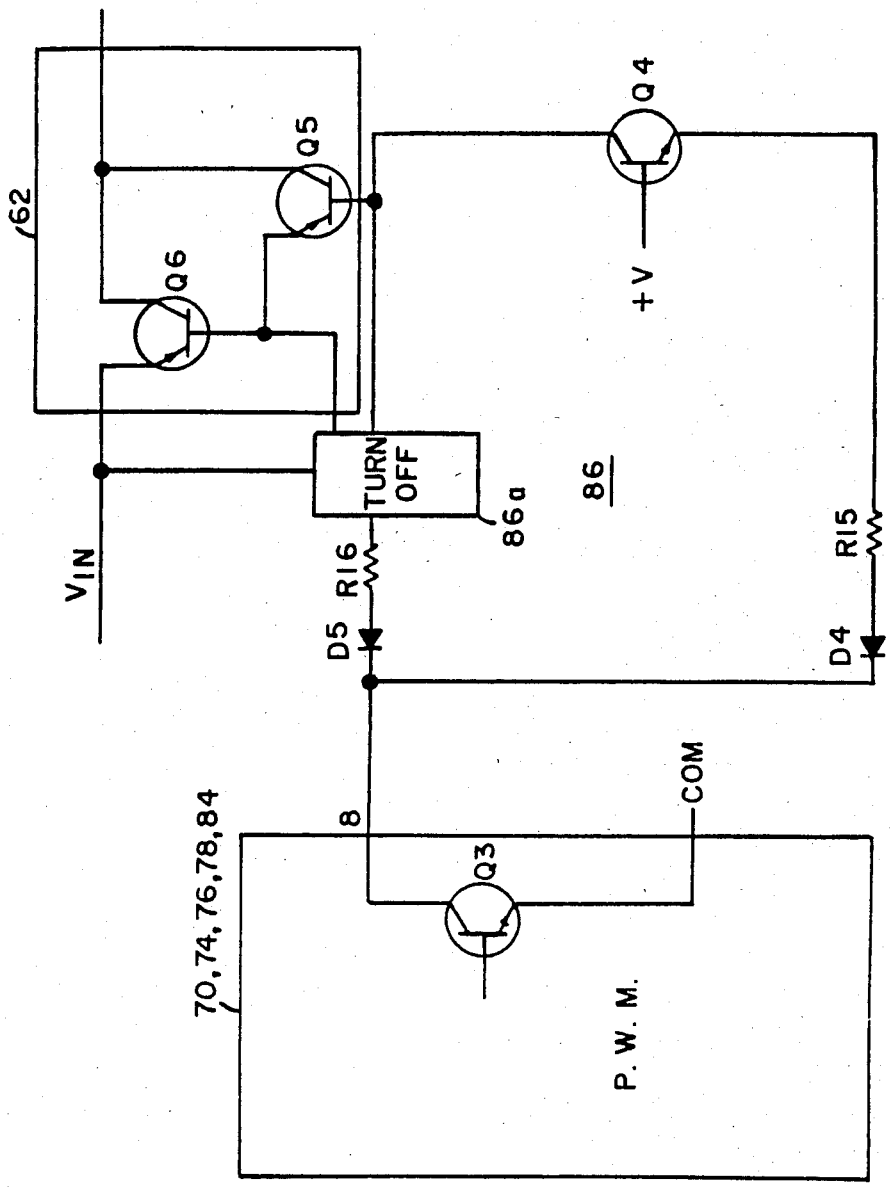
FIG. 5 is a schematic diagram of one embodiment of the drive circuit of the present invention.

R8=R9=47.5×10³ ohms
C3=0.0047 microfarads
R10=100×10³ ohms
R12=4.75×10³ ohms
R13=4.7×10⁶ ohms
C4=0.1 microfarads
R14=10×10³ ohms Referring to FIG. 5 there is shown a circuit for driver 86 of supply 24 which will accomplish the desirable results of generating a current which is independent of the variations in the unregulated input voltage to the supply and which responds to the p.w.m. signal of the supply in a manner so as to both start and stop quickly the flow of drive current. In describing the operation of this circuit it is assumed that the p.w.m. circuitry of supply 24 is embodied by the 494 chip. The chip includes a transistor Q3 whose collector is connected to output pin 8 upon which the p.w.m. signal generated by the chip appears. This signal is then used by driver circuit 86 to generate the drive current for power switch 62.

As shown in FIG. 5, driver circuit 86 includes a first diode D4, whose cathode is connected to pin 8 of the chip and a resistor R15, one end of which is connected in series relationship with the anode of the diode. The other end of the resistor R15 is connected to the emitter of a transistor Q4. The base of the transistor is connected to a source of constant voltage, V, and the collector thereof is connected to provide at the appropriate times in response to the p.w.m. signal on pin 8 the drive current for power switch circuit 62.

Drive circuit 86 also includes a second diode D5 whose cathode is also connected to pin 8 of the chip and whose anode is connected in series relationship with one end of a resistor R16. The other end of the resistor is connected to a turn-off circuit 86a which has a first connection to circuit 62 at the input thereof at which the voltage VIN2 appears and a second connection to the circuit 62 but at the input thereof which is connected to the collector of Q4. In response to the p.w.m. signal on pin 8 circuit 86a turns off at the appropriate times the flow of drive current to the power switch 62. Turn-off circuit 86a may be embodied by a suitably arranged switching configuration (not shown) comprising one or more transistors. The emitters of Q4 and the transistor(s) in turn-off circuit 86a operate at different potentials. The diodes D4 and D5 allow Q4 (which is in effect a turn-on circuit) and circuit 86a to share the p.w.m. signal on chip pin 8 but prevent the turn-on and turn-off circuits from providing current to each other. Power switch 62 includes the transistors Q5 and Q6 which are arranged in the well-known Darlington configuration.

The voltage at pin 8 of the chip is a p.w.m. waveform which alternates between a first relatively high level and a second relatively low level. The collector of transistor Q3 goes low each time there is to be a flow of current from driver 86 to power switch 62. Transistor Q4 is arranged in the common base configuration with the constant voltage V on its base providing a fixed bias. By arranging transistor Q4 to be in the common base configuration, the drive circuit provides the desirable fast start and fast stop characteristic of the drive current in response to the p.w.m. signal. When circuit 86 is to generate drive current, transistor Q3 goes into saturation. The voltage across the transistor is then minimal and the base drive current generated by driver 86 gives rise to only a small amount of heat which must be dissipated by the 494 chip. An additional advantage in having a constant base drive current for power switch 62 is that when the input voltage tends towards its high value, the charge accumulated in the base region of transistor Q5 does not rise to the excessive level that it would if the drive current increased with input voltage.

Figure 6:
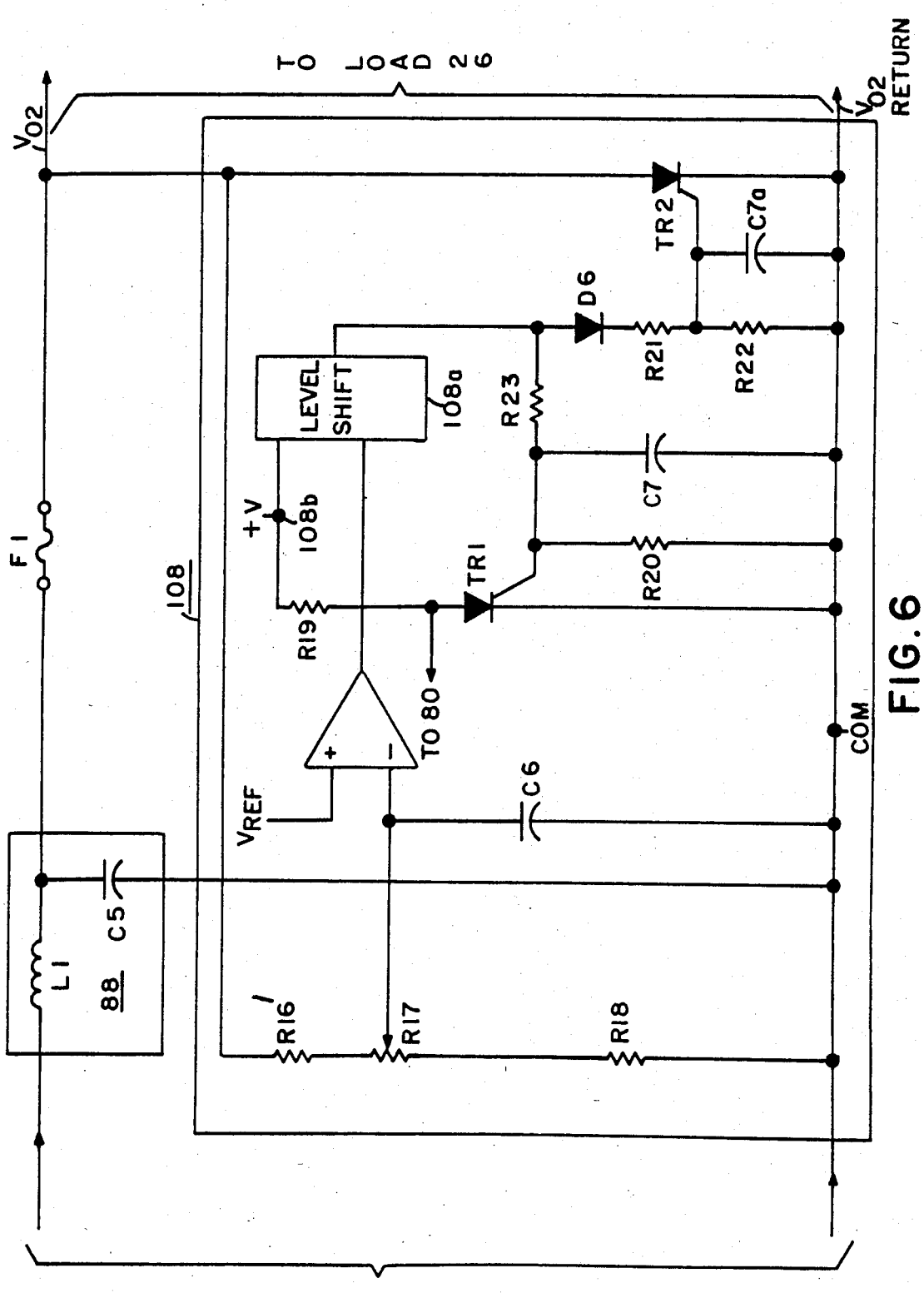
FIG. 6 is a schematic diagram of one embodiment of the nuisance trip-crowbar circuit of the present invention.

Referring to FIG. 6 there is shown a circuit 108 for use in supply 24 which accomplishes the desirable result of turning off that supply in the event an overvoltage condition occurs at its output without turning off the entire converter. The circuit 108 is connected across the output terminals (designated as Vo2 and Vo2 RETURN) of supply 24. As described previously in connection with FIG. 2B, power switch 62 of supply 24 is connected to the supply's output by L-C filter 88. The filter is shown in FIG. 6 as the combination of series inductor L1 and parallel capacitor C5. As fuse, F1, is connected in series between the inductor and the Vo2 output terminal.

Circuit 108 includes an operational amplifier whose noninverting input is connected to a source of reference voltage, V REF. The inverting input is connected to the adjustable part of an adjustable resistor R17 which has one end connected to the Vo2 terminal of supply 24 by a resistor R16' and the other end to supply common by a resistor R18. A voltage representive of the output voltage of the supply, therefore, appears at the inverting input terminal. The operational amplifier functions as an analog comparator and its output goes to a relatively low level when the voltage representative of the output voltage of the supply exceeds the reference voltage.

Circuit 108 also includes a first thyristor TR1 and a second thyristor TR2 each of which are controlled as a function of the output of the comparator. As will be described in more detail hereinafter, it is thyristor TR1 which attempts to turn off supply 24 in response to an overvoltage condition. Also, as will be described hereinafter, it is thyristor TR2 which in response to an overvoltage condition provides a short circuit path to allow excessive current to flow through fuse F1 if the supply is not in the process of being turned off.

Thyristor TR1 has its gate connected by a resistor R23 to the output of level shifting circuit 108a. Thyristor TR2 has its gate connected to the output of the level shifting circuit by the series combination of a diode D6, poled as shown, and a resistor R21. Level shifting circuit 108a has one of its two inputs connected to a source of positive voltage, +V, at the junction 108b and the other of its inputs connected to the output of the comparator. As described above, when the output voltage of the supply exceeds the predetermined level, the output of the comparator goes low. Thyristors TR1 and TR2 are of the type which needs a relatively high signal level on their respective gates to be turned on. This relatively high level is provided by level shifting circuit 108a.

The anode of thyristor TR1 is connected by a resistor R19 to the junction 108b. The anode of the thyristor is also connected to input voltage detection circuit 80 (see FIG. 2B) of the supply. As described previously, circuit 80 may be embodied by an operational amplifier, one input of which is connected to receive a voltage representative of the input voltage to supply 24. By connecting the anode of thyristor TR1 to this input to circuit 80, the turning on of the thyristor causes the voltage on that input to decrease thereby making it appear to circuit 80 that the input voltage has decreased below the reference level. This decrease in voltage causes circuit 80 to attempt to turn off the supply. If the overvoltage condition in the supply output resulted from a transient condition in the load, then the supply will be turned off. If the overvoltage condition resulted from a failure in the circuitry in the supply, as, for example, a short circuit in the power switch, then merely attempting to turn off the supply at its input will not be sufficient. In that case, it will be necessary to also open circuit fuse F1. A path for excessive current to flow in the fuse is provided by the firing of thyristor TR2.

The cathode of the thyristor TR2 is connected to supply common. The anode of thyristor TR2 is connected to the Vo2 output of the supply. When thyristor TR2 is turned on, it provides a short circuit between the Vo2 output of the supply and supply common. In this manner, excessive current may then be allowed to flow through fuse F1 to open circuit it.

It is desirable, however, to coordinate the firing of thyristors TR1 and TR2 such that an output overvoltage due to a load transient does not cause the fuse to open circuit. Circuit 108 accomplishes this result by having the series combination of diode D6 and resistor R21 connected to the gate of thyristor TR2. This combination raises the firing threshold of that thyristor to be higher than the firing threshold of thyristor TR1. The lower firing threshold for TR1 ensures that that thyristor will always fire ahead of the firing of TR2. In addition, as described above, the firing of TR1 results in an attempt to turn off the supply through circuit 80. If the supply can be turned off, the current needed to hold thyristor TR2 on if it has already fired is extinguished. Thus, an output overvoltage due to a load transient does not allow fuse F1 to open circuit, but an output overvoltage due to a failure in the supply does allow thyristor TR2 to fire and provide a short circuit path for current flow. When sufficient current flows in the short circuit, the fuse will open circuit. In either case, supply 24 will be turned off at either its input or its output without turning off supply 20 and, therefore, without turning off converter 10. In this manner, converter 10 can continue through supply 20 to provide power to load 22.

In a circuit constructed in accordance with the present invention, the following component values were used:

R16′ = 7.15 × 10³ ohms
R17 = 5 × 10³ ohms (adjustable)
R18 = 4.75 × 10³ ohms
R19 = 2.21 × 10³ ohms
R20 = 1 × 10³ ohms
R21 = 221 ohms
R22 = R ≦ = 100 ohms
C6 = 0.01 microfarads
C7a = C7 = 0.1 microfarads Resistors R20 and R22 provide a path for the leakage current of the TR1 and TR2 thyristors, respectively. Capacitors C7 and C7a provide filtering for noise signals to thereby desensitize the gate loop for each of the thyristors. In this manner, each of the thyristors are kept from being erroneously turned on by a noise signal. Resistor R20 and capacitor C7 are connected in parallel between the gate of TR1 and COM. Resistor R22 and capacitor C7a are connected in parallel between the gate of TR2 and COM.

It is to be understood that the descriptions of the preferred embodiments are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A circuit for use in a power supply of the type which includes a power switching means and a fuse connected in series with one of its two output terminals, said supply including means which attempts to turn off said power switching means in response to a signal from said circuit when the output voltage of the supply exceeds a reference signal representative of a predetermined amplitude of said output voltage and said circuit also capable of providing a short circuit across said output terminals, said circuit comprising:

means connected to said output terminals for generating a signal representative of said supply output voltage;

means responsive to said signal representative of said output voltage and said reference signal for generating an overvoltage signal when said output voltage exceeds said reference signal;

first semiconductor means having a control electrode connected to said overvoltage signal generating means and responsive to said overvoltage signal for turning on and generating said supply turn-off signal said semiconductor means having a turn-on threshold;

second semiconductor means having a control electrode and a turn-on threshold said second semiconductor means being connected to said output terminals to provide a short circuit thereacross when said second semiconductor means turns on; and means connected between said overvoltage signal generating means and said second semiconductor means control electrode for increasing said second means turn-on threshold to be greater than said first semiconductor means turn-on threshold, said second means turning on in response to said overvoltage signal later than the turn-on of said first semiconductor means and only if said turn-off means has not turned off said supply and only when said overvoltage signal exceeds said second semiconductor means increased turn-on threshold, the turning on of said second means providing said short circuit across said output terminals such that current sufficient to open said fuse may flow therethrough.

2. The circuit of claim 1, wherein said means for generating said overvoltage signal is a comparator.

3. The circuit of claim 1, wherein said first and second semiconductor means are thyristors.

4. The circuit of claim 1, wherein said threshold increasing means is the series combination of a diode and a resistor.

* * * * *